Nov. 9, 1965
W. L. ROBERTS
3,216,515
APPARATUS FOR DETERMINING WEIGHT PER UNIT
LENGTH OF ELONGATED PRODUCT
Filed Sept. 4, 1963
2 Sheets-Sheet 1
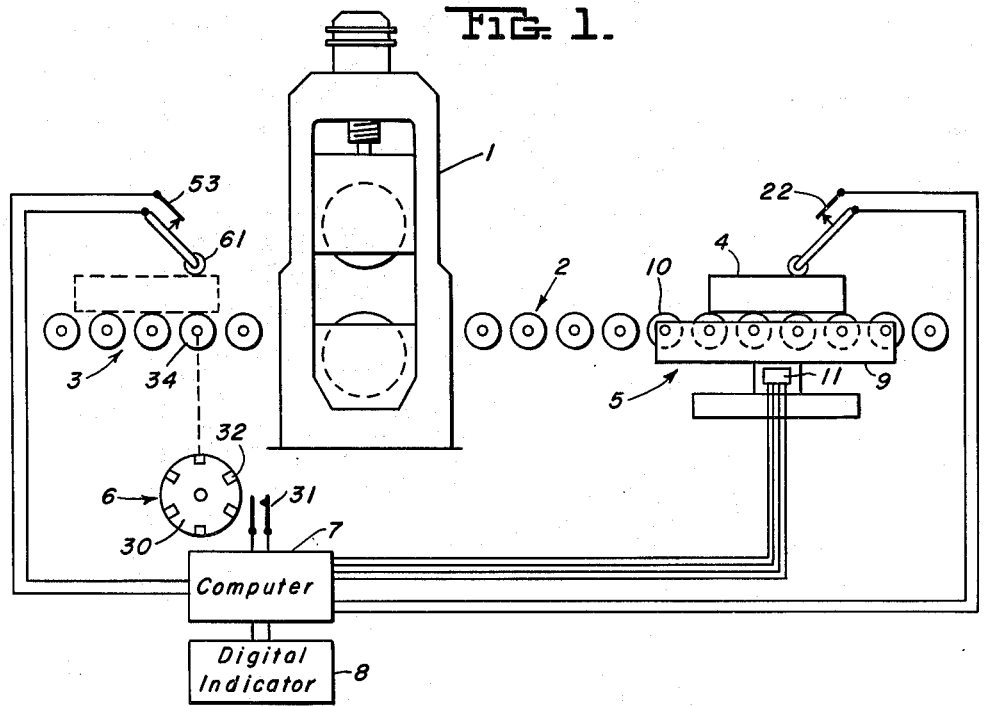
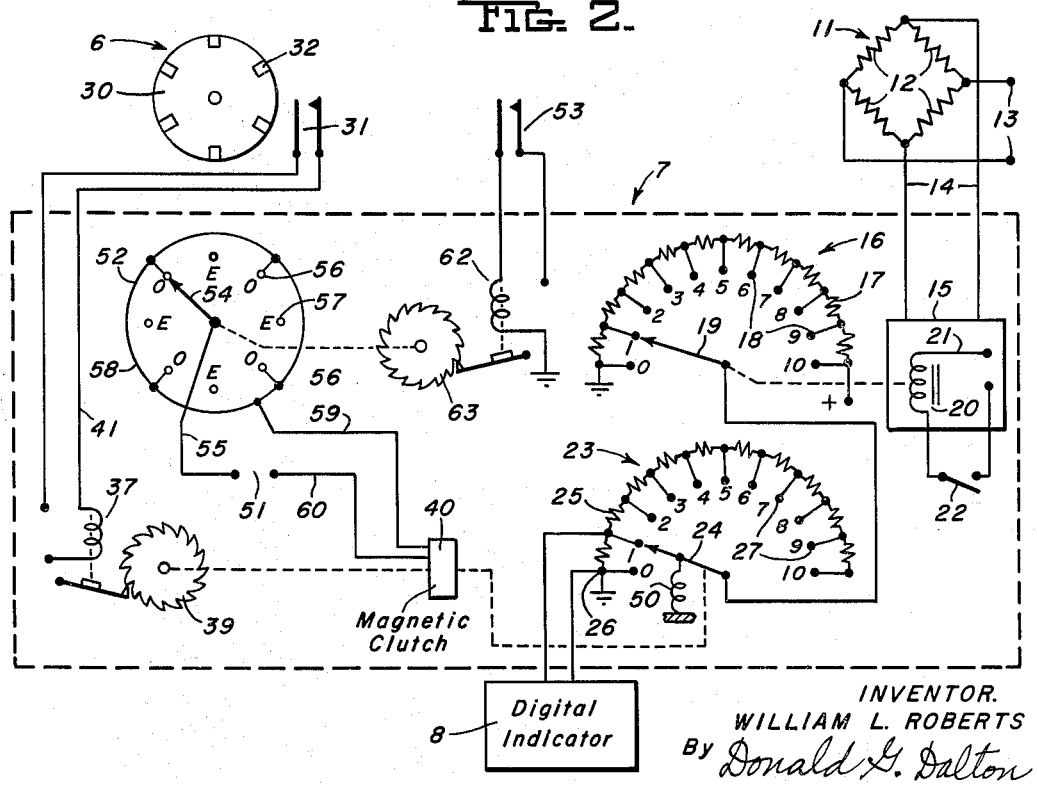
INVENTOR.
WILLIAM L. ROBERTS
By Donald G. Dalton
Attorney INVENTOR.
WILLIAM L. ROBERTS
By Donald G. Dalton
Attorney

United States Patent Office 3,216,515
Patented Nov. 9, 1965

3,216,515
APPARATUS FOR DETERMINING WEIGHT PER UNIT LENGTH OF ELONGATED PRODUCT
William L. Roberts, Murrysville, Pa., assignor to United States Steel Corporation, a corporation of New Jersey
Filed Sept. 4, 1963, Ser. No. 306,506
15 Claims. (Cl. 177—25)

This invention relates to an apparatus for weighing and measuring elongated product and, as indicated, for determining its weight per unit length. Such apparatus, more specifically, is especially adapted for use in mills for rolling steel or other metals where it will furnish an indication of the weight per foot of the rolled product.

In rolling mill operations, information concerning the weight per foot of the rolled product would be helpful both for rolling to the desired size and for reducing scrap losses. From the standpoint of size of the rolled product, such information would let the operator know whether further rolling is required or whether a screw-down adjustment of the rolls in a blooming or slabbing mill is needed. Where the product is subsequently cut for further rolling to a specified length, such information would result in a reduction of the scrap that must be cut from the ends of the subsequently rolled product.

One of the principal objects of this invention accordingly is to provide an apparatus that is especially suited for steel mill rolling operations and will furnish an indication of the weight per foot of the rolled product. A further object is to provide an apparatus of this character which will furnish the desired information without delay as the product is discharged onto a run-out table from the finishing stand of a rolling mill. For these and related purposes the invention contemplates an apparatus that includes a scale for weighing the product just prior to its delivery to a roll-stand and a mechanism that measures its length as it is discharged from the roll-stand onto a run-out table. The weigh-scale in such apparatus is preferably in the form of an electrical strain gauge that enables the production of an electrical signal proportional to the weight of the product. In a manner to be described this signal is used in conjunction with the length measuring mechanism to obtain a ratio value or indication that is representative of the weight per unit length of the product delivered to the mill run-out table.

Other objects and advantages of the invention will become apparent from the following description and the accompanying drawings, in which:

FIGURE 1 is a diagrammatic view illustrating the manner in which the apparatus of this invention is applied to a rolling mill;

FIGURE 2 is a circuit diagram that illustrates diagrammatically the essential structure of and the manner in which the components of the apparatus shown in FIGURE 1 cooperate with each other;

Figure 3:
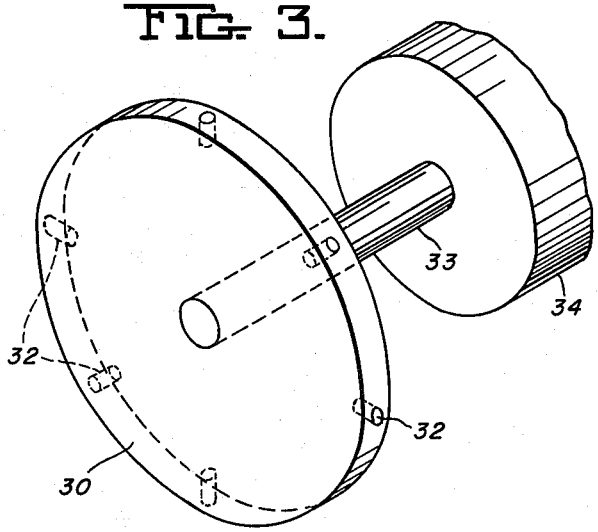
FIGURE 3 is a fragmentary perspective view of a portion of the length measuring mechanism used in the apparatus shown in FIGURE 1.

The apparatus of this invention is especially suited for rolling mills in steel mills and for this purpose FIGURE 1 of the drawings illustrates somewhat diagrammatically its application to a conventional arrangement of a rolling mill 1, such as a blooming or slabbing mill, which has a reversing drive for rolling the work in opposite directions and roller conveyor tables 2 and 3 arranged on opposite sides of the mill 1 for handling the work. The table 2 may be a run-in table for delivering an ingot or bloom 4 initially to the mill 1 and the table 3 may be a run-out or exit table on which it is received as it is discharged from the mill. The conveyor rollers of the tables 2 and 3 are equipped with reversing drives so that the ingot or bloom 4 may be reduced by successive passes back and forth through the mill.

In accordance with the principles of this invention, the run-in table 2 has a scale 5 for weighing the work such as a bloom 4 to be delivered to the mill 1, and the run-out table 3 has a mechanism 6 for measuring the length of the rolled product as it is discharged from the mill 1. Information concerning the weight and length of the rolled product is fed in the form of electrical signals by the scale 5 and length measuring mechanism 6 to a computer 7 that operates in the manner to be described to develop a voltage that corresponds to the weight per unit length of the product on the run-out table 3, and which may be read on digital voltage indicator 8.

The scale 5 is shown diagrammatically as comprising a weigh-table 9 that has a length and carries a sufficient number of conveyor rollers 10 such that the bloom 4 may be supported thereon while it is being weighed. The load on the weigh-table 9 is measured by an electrical strain gauge assembly 11 of conventional construction that comprises a plurality of resistors 12 connected in a Wheatstone bridge, which has its in-put circuit energized from a source 13 of direct current potential and has its out-put circuit 14 connected to a digital voltmeter 15 that forms part of the computer 7. The current flowing in the out-put circuit 14 varies with the weight of the bloom 4 on the table 9 and the digital voltmeter 15 uses this current to develop an electrical signal or voltage that is representative of the weight of the bloom 4. The digital voltmeter 15 is conventional and may, for example, be the one described in catalog 356 of Non-Linear Systems, Inc., Del Mar, California.

As shown diagrammatically in FIGURE 2, the digital voltmeter 15 includes a rotary stepping switch 16 that has a potentiometer resistor 17 connected between ground and a source of direct current potential, a plurality of tapping points 18 at equally spaced intervals along the length of the resistor 17, and a slide contactor 19 that is rotated in a clockwise direction and in a step-by-step manner over the tapping points 18. Rotation of the slide contactor 19 is effected by a pulsed operation of a solenoid 20. The voltmeter 15 pulses the operation of the solenoid 20 a number of times that corresponds to the strength of the signal in the out-put circuit 14 of the strain gauge 11. In this manner, the contactor 19 is moved to a rotational position that corresponds to the weight of the bloom 4 on the scale 5 and taps off a voltage from the resistor 17 that is proportional to such weight.

The pulsing circuit 21 for the solenoid 20 is completed through a limit switch 22 that is operated to closed position when the bloom 4 moves to a position supported by the scale 5. This limit switch 22 opens whenever the bloom 4 is transferred by the roller conveyor table 2 to the rolling mill 1 and thus to a position in which it is not supported by the scale 5. Opening of the limit switch 22 in this manner is effected before the bloom 4 is removed from the weigh-table 9 and the reading of the voltmeter 15, which is represented by the rotational position of the contactor 19, is thus retained until such time as the limit switch 22 closes again in response to movement of another bloom 4 to a position supported by the scale 5. When the switch 22 closes again in this manner the voltmeter 15 will operate to move the indicator or slide contactor 19 to a rotational position corresponding to the weight of the new bloom 4. The voltmeter 15 may be restored to a zero reading anytime by manually closing the limit switch 22 when a bloom is not supported on the weigh-table 9.

In a manner to be described, the computer 7 operates to produce an electrical signal which represents the ratio of the weight per unit length of the rolled product on the table 3 and, more specifically, is a fraction of the weight voltage that is tapped off by the slide contactor 19 of the stepping switch 16. For this purpose, the voltage developed by the stepping switch 16 is fed to a stepping switch 23 which has its slide contactor 24 connected in circuit with the slide contactor 19. The switch 23 further comprises a resistor 25 that has one end 26 connected to ground and a plurality of tapping points 27 at equally spaced points along its length. The slide contactor 24 is rotated in a clockwise direction by the length measuring mechanism 6 in a manner to be described to positions along the taps 27 corresponding to the length of the rolled product on the table 3. Operation of the slide contactor 24 in this manner thus introduces resistance in the circuit between the tapping point 27 engaged by the contactor 24 and the ground connection 26 that corresponds to the length of the rolled product, and since this resistance is in circuit with the voltage supplied to the contactor 24 by the stepping switch 16, which voltage as explained above is proportional to the weight of the bloom 4, the electrical current flowing in the resistance network between the contactor 24 and ground 26 will be a ratio value that is representative of the weight per unit length of the rolled product. This current flow in the resistance network 25 is measured by the digital voltmeter 8, which is connected across the resistance between the first and second tapping points 27 as shown in the drawings, and is calibrated, for example, to give a reading in pounds per foot of the rolled product.

Figure 4:
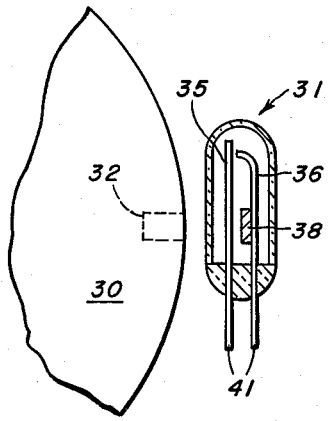
FIGURE 4 is a sectional view showing the arrangement of a magnetically responsive switch with respect to the magnet wheel shown in FIGURE 3.

The mechanism 6 for measuring the length of the product on the table 3 comprises a tachometer wheel 30 and a magnetic switch 31 that is operated by the wheel 30 a number of times corresponding to the length of the rolled product. The switch 31 is conventional and may be one such as described in Sales Engineering Bulletin No. 122 of C. P. Clare & Co., Chicago, Ill. The wheel 30 as shown in FIGURE 3 is a circular disc of aluminum or other non-magnetic material that has a plurality of circumferentially spaced cylindrical openings in each of which is mounted a small cylindrical magnet 32. The disc 30 is rotated by a shaft 33 that is connected with an idler roll 34, which is one of the conveyor rolls of the table 3 and is rotated in response to endwise movement of the product over the table 3. The switch 31, as shown in FIGURE 4, is positioned opposite the periphery of the wheel 30 and comprises a pair of non-magnetic resilient contactor elements 35 and 36 that are connected in an operating circuit 41 of a solenoid 37. The element 36 carries a magnetizable element 38 in the form of a soft iron plug that is attracted toward the wheel 30 each time one of the magnets 32 moves by the switch 31 and thus operates to move the contactor 36 into engagement with the contactor 35 and thus energize the solenoid 37. Each energization of the solenoid 37 in this manner is effective through a ratchet mechanism 39 and an electro magnetic clutch 40 to rotate the slide contactor 24 of the stepping switch 23 a single step in a clockwise direction. It will of course be understood that the stepping switch 23 like the switch 16 is illustrated diagrammatically as comprising a single semi-circular resistor element, but that such switches in practice are comprised of several stepped circular resistor elements to provide the necessary number of tapping points that are required by the operation. Since the conveyor roll 34 has frictional engagement with and is rotated by the rolled product moving over the conveyor table 3, the rotation of the disc 30 driven thereby and the number of operations of the switch 31 by the magnets 32 will furnish an indication of the length of the product travelling over the roll 34.

Figure 5:
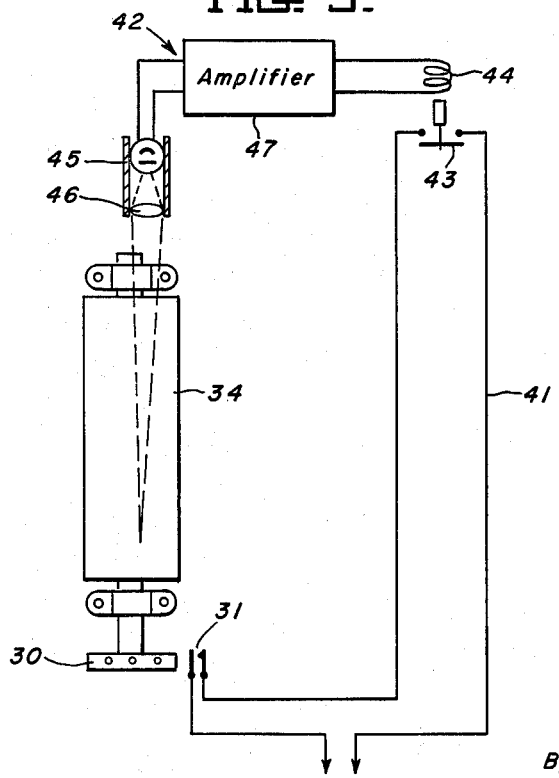
FIGURE 5 is a plan view showing a part of the circuit of the length measuring mechanism.

To prevent a false indication of length by rotation of the roll 34, for example, by inertia, when work is not moving over its periphery, the circuit 41 connecting the magnetic switch 31 with the solenoid 37 is preferably controlled by a photosensitive relay 42 as shown in FIGURE 5. The relay 42 comprises a contactor 43 in the circuit 41 and a coil 44 which is energized to close the contactor 43 only when work is postioned over the conveyor roll 34. Energization of the coil 44 to close the contactor 43 is controlled by a photocell 45 that is rendered conductive by light from hot metal over the roll 34 being focused on it through a collimating lens 46. The photocell 45 operates through an amplifier 47 to energize the coil 44 to actuate the control contactor 43 to closed position. When there is no work over the roll 34, the phototube 45 ceases to conduct and the coil 44 is deenergized to open the relay contactor 43, so that colsure of the magnet switch 31 by rotation of the roll 34 will not cause a length indicating operation of the stepping switch 23.

The mechanism for returning the slide contactor 24 of the switch 23 to zero position is indicated diagrammatically by a spring 50. In order that the spring 50 will be effective for this purpose, and to prevent rotation of the contactor 24 in a clockwise direction and thus an undesired length indication when the product is moving from left to right over the table 3 as viewed in FIGURE 1 in being returned to the mill 1 for a further rolling reduction, the energizing connection of the clutch 40 to a D.C. source 51 is controlled by a stepping switch 52 and a limit switch 53. The switch 52 comprises a rotatable contactor 54 that is connected by a conductor 55 to one terminal of the source 51. The contactor 54 further has successive engagement with alternately arranged tapping points 56 and 57 upon stepping rotation thereof. The tapping points 56 are eletrically connected with a ring conductor 58 that completes an energizing circuit through a lead 59 to the clutch 40 and through a lead 60 from the clutch 40 to the other side of the source 51. The intermediate tapping points 57 are open so that when the stepping switch 54 has engagement therewith the energizing circuit for the clutch 40 is open and the clutch 40 consequently deenergized so that the spring 50 is effective to return the contactor 24 to its zero position.

Stepping operation of the switch 52 is controlled by the limit switch 53 which has an actuating roller 61 centered over the idler conveyor roller 34 so that it closes in response to movement of the bloom 4 into engagement with the roller 34 and opens when the bloom moves out of engagement therewith. Closure of the switch 53 completes an energizing circuit through a solenoid 62 that operates a ratchet mechanism 63 which in turn rotates the stepping switch contactor 54 to a successive one of the tapping points 56 or 57. The tapping points 56 and 57 are so arranged that a tapping point 56 is engaged by the contactor 54 and the clutch 40 is energized only when the bloom 4 is moving from right to left over the conveyor roller 34 as viewed in FIGURE 1. Upon return movement of the bloom 4 to the mill 1, closure of the limit switch 53 operates to move the contactor 54 to engage a tapping point 57 to deenergize the clutch 40 to provide for resetting of the stepping switch 23 by its resetting spring 50.

Alternatively, energization of the solenoid 62 for effecting stepping operation of the switch 52 as described above may be controlled by a load responsive relay such as a strain gauge that operates in response to loading of the roll stand 1 by movement of the bloom 4 therethrough.

From the foregoing it will be apparent that the apparatus of this invention will provide at the digital indicator 8 a reading of the weight per unit length of a steel or other metal product moving through a rolling mill 1. This reading is of course the quotient or ratio of the weight to the length of the product and it will be further apparent that the divisional operation necessary to obtain this reading is effected by the stepping switches 16 and 23 in the computer 8. In this respect attention is particularly directed to the fact that operation of the stepping switch 16 by the strain gauge 11 results in a voltage that is representative of the weight of the product 4 on the weighscale 5 and is fed to the contactor 24 of the stepping switch 23, while the length measuring mechanism 6 operates to move the latter contactor 24 to a position corresponding to the length of the product to render the switch 23 effective to perform the necessary dividing operation and thus produce an electrical signal across the initial section of the resistor 25, which is representative of the weight per unit length of the product and is read by the digital indicator 8.

While one embodiment of my invention has been shown and described it will be apparent that other adaptations and modifications may be made without departing from the scope of the following claims.

I claim:

1. In apparatus of the character described, a scale for weighing an elongated article, means for measuring the length of said article, and means operated by said scale and length measuring means for determining units of weight per unit length of said article.

2. In apparatus of the character described, a scale for weighing an elongated article, means operated by said scale for producing a signal proportional to the weight of said article, means for measuring the length of said article, and means responsive to said signal and said length measuring means for determining units of weight per unit length of said article.

3. The combination with the apparatus defined in claim 2 of a roller conveyor table over which said article travels and by said length measuring means including means responsive to movement of said article over said table for determining its length.

4. The combination with a rolling mill having roller conveyor tables on opposite sides thereof for delivering work to and from the mill, of a scale associated with one of said tables for weighing the work before delivery to the mill, means associated with the other of said tables for measuring the length of the work after movement through said mill, and means responsive to operation of said scale and said length measuring means for determining the weight per unit length of said work.

5. Apparatus as defined in claim 4 characterized by said scale comprising an electrical strain gauge subject to the weight of the work being delivered over said one table to said mill and including means operative to develop an electrical signal proportional to its weight.

6. An apparatus for determining the weight per unit length of an elongated article comprising a scale for weighing said article, means operated by said scale for producing an electrical signal proportional to the weight of said article, means for measuring the length of said article, and means responsive to said electrical signal and operated by said length measuring means for developing a second electrical signal corresponding to the weight per unit length of said article.

7. Apparatus as defined in claim 6 characterized by said scale operated means comprising a first stepping switch that is operated to a position corresponding to the weight of said article and by said signal responsive means comprising a second stepping switch that is operated by said length measuring means to a position corresponding to the length of said article.

8. An apparatus for determining the weight per unit length of an elongated article comprising, in combination, a conveyor over which said article travels in a lengthwise direction, means including a strain gauge subject to the weight of said article and operative to develop an electrical signal corresponding to its said weight, means responsive to movement of said article over said conveyor for measuring its length, and means responsive to said signal and said length measuring means for developing a second electrical signal corresponding to the weight per unit length of said article.

9. An apparatus as defined in claim 8 in which said article travels in opposite directions over said conveyor and characterized further by means for rendering said length measuring means inoperative during movement of said article over said conveyor in one of said directions.

10. Apparatus as defined in claim 8 characterized by said length measuring means comprising a rotatable member having a plurality of magnets at spaced intervals about its periphery, means for rotating said member in response to movement of said article over said conveyor, a magnetic switch arranged opposite the periphery of said member for operation by said magnets, and by said responsive means including a stepping switch that is operated by said magnetic switch to a position corresponding to the length of said article.

11. Apparatus as defined in claim 10 characterized further by said stepping switch including variable resistor means connected in circuit with said electrical signal.

12. An apparatus as defined in claim 10 in which said article travels in opposite directions over said conveyor and characterized further by means for operating said stepping switch comprising a magnetic clutch, means responsive to operation of said magnetic switch for rotating said clutch to actuate said stepping switch, and means controlling the energization of said clutch and operating in response to the direction of movement of said article over said conveyor for rendering said clutch inoperative to actuate said switch upon movement of said article in one of said directions.

13. An apparatus as defined in claim 12 characterized by said last-named means comprising a stepping switch including means for effecting its operation in response to reversal of the direction of movement of said article over said conveyor.

14. An apparatus as defined in claim 13 characterized by an energizing circuit for said clutch and by said last-named stepping switch having successive contacts alternate ones of which are connected in said energizing circuit.

15. In apparatus of the character described, means for weighing an elongated article and for producing an impulse proportional to its weight, means for measuring the length of said article, and means operated by said impulse and by said length measuring means for determining units of weight per unit length of said article.

References Cited by the Examiner

UNITED STATES PATENTS

| 2,708,368 | 5/55 | Kolish | 73—432 |
| 2,746,739 | 5/56 | Philippovic | 235—61 |
| 2,836,980 | 6/58 | Giepen | 73—432 |
| 3,005,590 | 10/61 | Giltinan | 235—196 |

FOREIGN PATENTS

| 278,662 | 4/28 | Great Britain. |

LEO SMILOW, *Primary Examiner.*